United States Patent
Mulzer et al.

(10) Patent No.: US 10,858,541 B2
(45) Date of Patent: Dec. 8, 2020

(54) CURABLE COMPOSITION

(71) Applicant: Rohm and Haas Electronic Materials LLC, Marlborough, MA (US)

(72) Inventors: Michael Mulzer, Marlborough, MA (US); Yusuke Matsuda, Glen Mills, PA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 67 days.

(21) Appl. No.: 16/208,983

(22) Filed: Dec. 4, 2018

(65) Prior Publication Data

US 2019/0185710 A1 Jun. 20, 2019

Related U.S. Application Data

(60) Provisional application No. 62/607,656, filed on Dec. 19, 2017.

(51) Int. Cl.
| | |
|---|---|
| *C09D 183/12* | (2006.01) |
| *C09D 7/63* | (2018.01) |
| *C09D 7/40* | (2018.01) |
| *C08J 7/04* | (2020.01) |
| *C08K 5/00* | (2006.01) |
| *C08G 77/06* | (2006.01) |
| *C08J 3/24* | (2006.01) |
| *C09D 183/06* | (2006.01) |
| *C08G 77/00* | (2006.01) |
| *C08G 77/14* | (2006.01) |
| *C08G 77/18* | (2006.01) |
| *C08G 77/46* | (2006.01) |

(52) U.S. Cl.
CPC ........... *C09D 183/12* (2013.01); *C08G 77/06* (2013.01); *C08G 77/14* (2013.01); *C08G 77/18* (2013.01); *C08G 77/80* (2013.01); *C08J 3/24* (2013.01); *C08J 7/04* (2013.01); *C08J 7/0427* (2020.01); *C08K 5/0025* (2013.01); *C09D 7/63* (2018.01); *C09D 7/67* (2018.01); *C09D 7/68* (2018.01); *C09D 183/06* (2013.01); *C08G 77/46* (2013.01); *C08J 2367/02* (2013.01); *C08J 2379/08* (2013.01); *C08J 2483/04* (2013.01)

(58) Field of Classification Search
None
See application file for complete search history.

(56) References Cited

U.S. PATENT DOCUMENTS

| | | | | |
|---|---|---|---|---|
| 5,863,970 A * | 1/1999 | Ghoshal | ............... | C08G 59/226 523/434 |
| 8,779,059 B2 * | 7/2014 | Sato | .................. | C08G 59/24 257/793 |
| 9,382,373 B2 | 7/2016 | Potisek et al. | | |
| 2007/0027233 A1* | 2/2007 | Yamaguchi | ............. | C08L 51/04 523/467 |
| 2007/0251419 A1 | 11/2007 | Yamaguchi et al. | | |
| 2009/0065244 A1* | 3/2009 | Kimura | ................ | C08L 101/00 174/258 |
| 2010/0016494 A1* | 1/2010 | Burns | .................... | C08G 59/24 524/492 |
| 2010/0191001 A1* | 7/2010 | Wassmer | ............... | C08G 77/14 549/215 |
| 2013/0158159 A1* | 6/2013 | Iyer | ...................... | C09D 183/06 523/122 |
| 2014/0255832 A1* | 9/2014 | Qiu | ......................... | C08G 77/16 430/5 |
| 2015/0037567 A1* | 2/2015 | Clear | ................... | C09D 133/12 428/331 |
| 2016/0145467 A1* | 5/2016 | Fukaumi | .............. | C09D 183/06 428/447 |
| 2016/0152819 A1* | 6/2016 | Balijepalli | ............ | C09J 163/00 523/456 |
| 2016/0297960 A1* | 10/2016 | Aguirre-Vargas | ..... | C08G 59/24 |
| 2016/0376435 A1* | 12/2016 | Hagenbucher | ......... | C08G 59/22 427/508 |
| 2017/0335132 A1 | 11/2017 | Lee | | |
| 2017/0369654 A1* | 12/2017 | Kao | ..................... | C09D 183/06 |
| 2018/0215948 A1 | 8/2018 | Kim et al. | | |

FOREIGN PATENT DOCUMENTS

EP 0335629 A2 4/1989

* cited by examiner

*Primary Examiner* — Robert S Loewe
(74) *Attorney, Agent, or Firm* — Shaorong Chen

(57) ABSTRACT

A curable composition comprising an epoxy-siloxane oligomer comprising as polymerized units one or more difunctional silane monomers of formula (1) and one or more trifunctional silane monomers of formula (2) in a mole ratio of 95:5 to 10:30

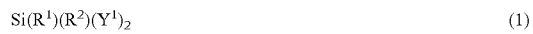

$$Si(R^1)(R^2)(Y^1)_2 \qquad (1)$$

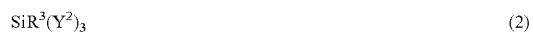

$$SiR^3(Y^2)_3 \qquad (2)$$

wherein $R^1$, $R^2$, and $R^3$ are independently chosen from a $C_{5-20}$-aliphatic group comprising an oxirane ring fused to an alicyclic ring, $C_{1-20}$-alkyl, $C_{6-30}$-aryl group, and a $C_{5-20}$-aliphatic group having one or more heteroatoms; each $Y^1$ and $Y^2$ is independently chosen from halogen, $C_{1-4}$-alkoxy, and —O—$C_{1-4}$-acyl group; wherein at least one of $R^1$, $R^2$, and $R^3$ is a $C_{5-20}$-aliphatic group comprising an oxirane ring fused to an alicyclic ring; (b) organic particles having an average diameter of 50 to 250 nm; (c) a reactive carrier having one or more epoxy moieties or oxetane moieties; (d) a curing agent; and (e) one or more organic solvents, and methods of forming cured coatings using such compositions are described.

10 Claims, No Drawings

CURABLE COMPOSITION

The present invention is directed to the field of curable coatings, and more particularly to liquid, curable siloxane-based coating formulations which can be applied to plastic substrates for optical uses.

The display industry has an interest in flexible devices which can be bent, folded or rolled like paper. Such flexible display devices are envisioned to use a plastic substrate instead of the glass substrate used in conventional displays as plastic substrates are more flexible than glass ones, and are less susceptible to breakage. Plastic suitable for use as a display substrate must also possess sufficient optical clarity. While plastics possess many of the characteristics needed for a flexible substrate, they do not have a sufficiently high surface hardness demanded by display applications. Hard coating compositions are used to deposit a hard coat on the surface of the plastic substrate to increase the surface hardness. Such hard coating compositions contain an organic solvent and are typically deposited using liquid coating techniques. The industry trend toward curved displays, such as in mobile phones, requires curved protective films that match the curve of the display. The protective films must be moldable at relatively high temperatures, typically near or above the $T_g$ of the polymer used, which requires a film with relatively high flexibility (that is, a relatively small bending radius) and a relatively high elongation-to-break. Relatively high flexibility and hardness are usually contradictory properties in protective films.

Published U.S. Patent Application No. 2016/0154436 (Woo et al.) discloses compositions suitable for forming a window film comprising certain siloxane resins, an initiator, and optionally other additives such as nanoparticles. The only nanoparticles disclosed in this reference are inorganic, and can further improve the hardness of the window film. There remains a need in the industry for films having a sufficient hardness while also having improved elongation-to-break values.

The present invention provides a composition comprising: (a) 5 to 85 wt % of an epoxy-siloxane oligomer comprising as polymerized units one or more difunctional silane monomers of formula (1) and one or more trifunctional silane monomers of formula (2) in a mole ratio of 95:5 to 10:30

$$Si(R^1)(R^2)(Y^1)_2 \quad (1)$$

$$SiR^3(Y^2)_3 \quad (2)$$

wherein $R^1$, $R^2$, and $R^3$ are independently chosen from a $C_{5-20}$-aliphatic group comprising an oxirane ring fused to an alicyclic ring, $C_{1-20}$-alkyl, $C_{6-30}$-aryl group, and a $C_{5-20}$-aliphatic group having one or more heteroatoms; each $Y^1$ and $Y^2$ is independently chosen from halogen, $C_{1-4}$-alkoxy, and —O—$C_{1-4}$-acyl group; wherein at least one of $R^1$, $R^2$, and $R^3$ is a $C_{5-20}$-aliphatic group comprising an oxirane ring fused to an alicyclic ring; (b) 1 to 20 wt % of organic particles having an average diameter of 50 to 250 nm; (c) 3 to 50 wt % of a reactive carrier having one or more epoxy moieties or oxetane moieties; (d) 0.5 to 8 wt % of a curing agent; and (e) 1 to 60 wt % of one or more organic solvents.

Also provided by the present invention is a method comprising: (a) providing a flexible substrate; and (b) disposing a layer of a coating composition described above on the flexible substrate; and (c) curing the layer of the coating composition.

As used throughout this specification, the following abbreviations shall have the following meanings, unless the context clearly indicates otherwise: ° C.=degree Celsius; g=gram; mg=milligram; L=liter; mL=milliliter; GPa=gigapascal; cm=centimeter; nm=nanometer; mN=milliNewton; kgf=kilogram-force; fpm=feet per minute; ca.=approximately; mW=milliWatt; mJ=milliJoule; and Da=dalton. Unless otherwise specified, all amounts are percent by weight ("wt %") and are based on the total weight of the components. All ratios are molar ratios, unless otherwise specified. All numerical ranges are inclusive and combinable in any order, except where it is clear that such numerical ranges are constrained to add up to 100%. The articles "a", "an" and "the" refer to the singular and the plural. The terms "resin" and "polymer" are used interchangeably. "Alkyl" refers to linear, branched and cyclic alkyl unless otherwise specified. "Alkyl" refers to an alkane radical, and includes alkane monoradicals, diradicals (alkylene), and higher-radicals. "Halo" refers to fluoro, chloro, bromo, and iodo. When an element is referred to as being "on" another element, it can be directly on the other element or intervening elements may be present therebetween. In contrast, when an element is referred to as being "directly on" another element, there are no intervening elements present. The term "oligomer" refers to dimers, timers, tetramers and other relatively low molecular weight polymeric materials that are capable of further curing. As used herein, the term "oligomer" refers to a molecule having from 3 to 200 polymerized monomer units, preferably at least 5, preferably at least 7, preferably no more than 175, preferably no more than 150. By the term "curing" is meant any process, such as polymerization or condensation, that increases the overall molecular weight of the present oligomers. "Curable" refers to any material capable of being cured under certain conditions. When the state of a material described herein is referred to as "liquid", "solid", or "gaseous", such reference is made to the state of the material at room temperature and atmospheric pressure, unless otherwise specified.

Number-average and weight-average molecular weights were determined against monodisperse polystyrene standards. Samples were prepared by dilution with THF (tetrahydrofuran, HPLC grade, uninhibited, Fisher) to 0.5-1 wt %, followed by filtration (0.2 µm, PTFE). Injection volume: 100 µl; Eluent: THF; Columns Shodex-KF805, Shodex-KF804, Shodex-KF803, Shodex-KF802 (4 in series, System A), or Agilent PLgel Mixed C column set (2 in series, 5 µm particle size, 30 cm×7.6 mm column, System B); Flow rate: 1.2 mL/min; Column temperature: 35° C. A Waters 2414 refractive index detector was used. A coating is optically transparent if it exhibits an average light transmittance of at least 80%, and preferably at least 85% over the wavelength range of 380-700 nm.

Silicon monomers are often referred to by the number of hydrolyzable moieties bonded to silicon in the monomer. For example, "M monomer" refers to a silicon monomer having one hydrolyzable moiety such as monomers of the formula $R_3SiX$, "D monomer" refers to a silicon monomer having two hydrolyzable moieties such as monomers of the formula $R_2SiX_2$, "T monomer" refers to a silicon monomer having three hydrolyzable moieties such as monomers of the formula $RSiX_3$, and "Q monomer" refers to a to a silicon monomer having four hydrolyzable moieties such as monomers of the formula $SiX_4$, where X in each monomer is a hydrolyzable moiety. As used herein, "hydrolyzable moiety" refers to any moiety capable of being hydrolyzed under conditions used to condense, cure, or otherwise polymerize silane monomers. "D:T ratio" refers to the molar ratio of D monomers to T monomers in a given siloxane resin.

The inventors have found that hard coating compositions containing certain organic nanoparticles have improved elongation-to-break values while maintaining sufficient flexibility and hardness. Accordingly, the present invention provides a composition comprising: (a) 5 to 85 wt % of an epoxy-siloxane oligomer comprising as polymerized units one or more difunctional silane monomers of formula (1) and one or more trifunctional silane monomers of formula (2) in a mole ratio of 95:5 to 10:30;

$$Si(R^1)(R^2)(Y^1)_2 \quad (1)$$

$$SiR^3(Y^2)_3 \quad (2)$$

wherein $R^1$, $R^2$, and $R^3$ are independently chosen from a $C_{5-20}$-aliphatic group comprising an oxirane ring fused to an alicyclic ring, $C_{1-20}$-alkyl, $C_{6-30}$-aryl group, and a $C_{5-20}$-aliphatic group having one or more heteroatoms; each $Y^1$ and $Y^2$ is independently chosen from halogen, $C_{1-4}$-alkoxy, and —P—$C_{1-4}$-acyl group; wherein at least one of $R^1$, $R^2$, and $R^3$ is a $C_{5-20}$-aliphatic group comprising an oxirane ring fused to an alicyclic ring; (b) 1 to 20 wt % of organic particles having an average diameter of 50 to 250 nm; (c) 3 to 50 wt % of a reactive carrier having one or more epoxy moieties or oxetane moieties; (d) 0.5 to 8 wt % of a curing agent; and (e) 1 to 60 wt % of one or more organic solvents. Preferably, the epoxy-siloxane oligomer is used in an amount of 10 to 80 wt %, and more preferably from 20 to 75 wt %, based on the total weight of the composition. In an alternate preferred embodiment, the epoxy-siloxane oligomer is used in an amount of 25 to 70 wt %, based on the total weight of the composition. Preferably, the organic particles are present in an amount of 1 to 10 wt %, and more preferably in an amount of from 1 to 5 wt %, based on the weight of the composition. It is preferred that the reactive carrier is present in an amount of from 4 to 40 wt %, and more preferably from 4 to 25 wt %, based on the weight of the composition. The curing agent is preferably used in an amount of 0.5 to 5 wt %, and more preferably from 1 to 3 wt %, based on the total weight of the composition. Preferably, the total organic solvents used is 1 to 50 wt %, based on the total weight of the composition.

In the monomers of formula (1) and formula (2), $R^1$, $R^2$, and $R^3$ are independently chosen from a $C_{5-20}$-aliphatic group comprising an oxirane ring fused to an alicyclic ring, $C_{1-20}$-alkyl, $C_{6-30}$-aryl group, and a $C_{5-20}$-aliphatic group having one or more heteroatoms. It is preferred that the alicyclic ring has 5 or 6 carbon atoms, preferably six carbon atoms, and more preferably is a cyclohexane ring. A preferred $C_{5-20}$-aliphatic group comprising an oxirane ring fused to an alicyclic ring is an epoxycyclohexyl (that is, a cyclohexene oxide) group linked to silicon by a —$(CH_2)_j$— group, where j is from 1 to 6, and preferably 1 to 4. Preferably, when any of $R^1$, $R^2$, and $R^3$ is alkyl it contains no more than 15 carbon atoms, more preferably no more than 12, and yet more preferably no more than 10. Preferably, when any of $R^1$, $R^2$, and $R^3$ is an aryl group it preferably contains no more than 25 carbon atoms, more preferably no more than 20, and yet preferably no more than 16. The term "$C_{5-20}$-aliphatic group having one or more heteroatoms" refers to a $C_{5-20}$-aliphatic group having one or more of: a halogen such as fluorine; an ester group such as an acrylate group, a methacrylate group, a fumarate group, or a maleate group; a urethane group; and a vinyl ether group. In the present epoxy-siloxane oligomers, at least one of $R^1$, $R^2$, and $R^3$ is a $C_{5-20}$-aliphatic group comprising an oxirane ring fused to an alicyclic ring, and preferably at least one of $R^1$, $R^2$, and $R^3$ is an epoxycyclohexyl group linked to silicon by a —$(CH_2)_j$— group, where j is from 1 to 6, and preferably 1 to 4. It is preferred that each of $R^1$, $R^2$, and $R^3$ is free of a UV absorbing group chosen from an unsubstituted or substituted hydroxybenzophenone group, an unsubstituted or substituted hydroxyphenyltriazine group, or a group represented by the formula *—$(R^x)_{n1}$-M-$(R^x)_{n2}$—$R^y$; wherein * represents a point of attachment to Si, $R^x$ is an unsubstituted or substituted $C_{1-20}$ alkylene group, an unsubstituted or substituted $C_{1-20}$ alkyleneoxy group, an unsubstituted or substituted $C_{1-20}$ alkylene group having a urethane bond therein or at an end thereof, an unsubstituted or substituted $C_{1-20}$ alkyleneoxy group having a urethane bond therein or at an end thereof, an unsubstituted or substituted $C_{1-20}$ arylene group, or a combination thereof; n1 and n2 are each independently 0 or 1; M is a single bond, oxygen (O), sulfur (S), NR where R is hydrogen or a $C_{1-20}$ alkyl group, —CONH—, —OCONH—, —C(=O)—, or —C(=S)—; $R^y$ is an unsubstituted or substituted benzotriazole group, an unsubstituted or substituted benzophenone group, an unsubstituted or substituted hydroxybenzophenone group, an unsubstituted or substituted triazine group, an unsubstituted or substituted salicylate group, an unsubstituted or substituted cyanoacrylate group, an unsubstituted or substituted oxanilide group, an unsubstituted or substituted hydroxyphenyltriazine group, an unsubstituted or substituted hydroxyphenylbenzotriazole group, or an unsubstituted or substituted hydroxyphenylbenzophenone group; 0<x<1; 0<y<1; 0<z<1; and x+y+z=1. In the monomers of formula (1) and formula (2), each $Y^1$ and $Y^2$ is preferably independently chosen from $C_{1-4}$-alkoxy, and —O—$C_{1-4}$-acyl group; and more preferably methoxy, ethoxy, and acetoxy. Preferably, the present epoxy-siloxane oligomers comprise as polymerized units the monomers of formula (1) and formula (2) in a mole ratio of 90:10 to 10:30, and more preferably from 85:15 to 10:15.

It is preferred that the organic particles used in the present compositions have an average diameter of 50 to 150 nm, and more preferably 75 to 125 nm. A variety of organic particles may suitably be used in the present compositions, and preferably the organic particles are core-shell rubber (CSR) particles. Such CSR particles comprise a rubber particle core and a relatively harder organic shell layer. The shell layer of the CSR nanoparticles provides compatibility with the hard coat composition and has limited swellability to facilitate mixing and dispersion of the CSR nanoparticles in the hard coat composition. Exemplary shell layers may be (meth)acrylate-based, epoxy-based, or a combination thereof. Exemplary cores may be composed of polybutadiene-based polymers, butadiene-styrene polymers, (meth)acrylate-based polymers, and combinations thereof. Suitable CSR nanoparticles are commercially available, such as those available under the following tradenames: Paraloid EXL 2650 A, EXL 2655, EXL2691 A, available from The Dow Chemical Company, or Kane Ace™ MX series from Kaneka Corporation, such as MX 120, MX 125. MX 130, MX 136, MX 551, or METABLEN SX-006 available from Mitsubishi Rayon, or Genioperl P52 from Wacker Chemie AG. The present compositions are preferably free of inorganic particles, such as inorganic nanoparticles.

The reactive carrier having one or more epoxy moieties or oxetane moieties useful in the present compositions may be an epoxy moiety or oxetane moiety containing monomer or oligomer. Preferably, the reactive carrier comprises at least two epoxy moieties, more preferably at least two epoxycyclohexane groups, and more preferably two epoxycyclohexane groups. Preferred reactive carriers are shown below, where n, x, and y refer to the number of repeat units, where n=1 to 100, x=1 to 100, and y=1 to 100.

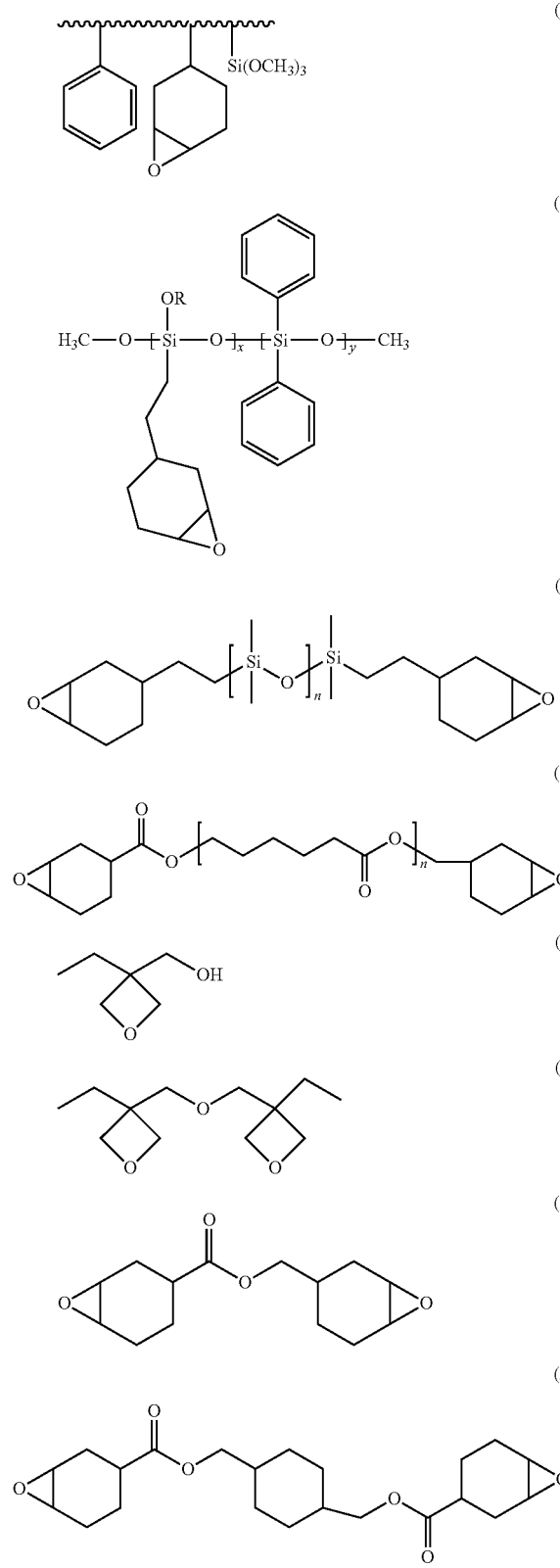

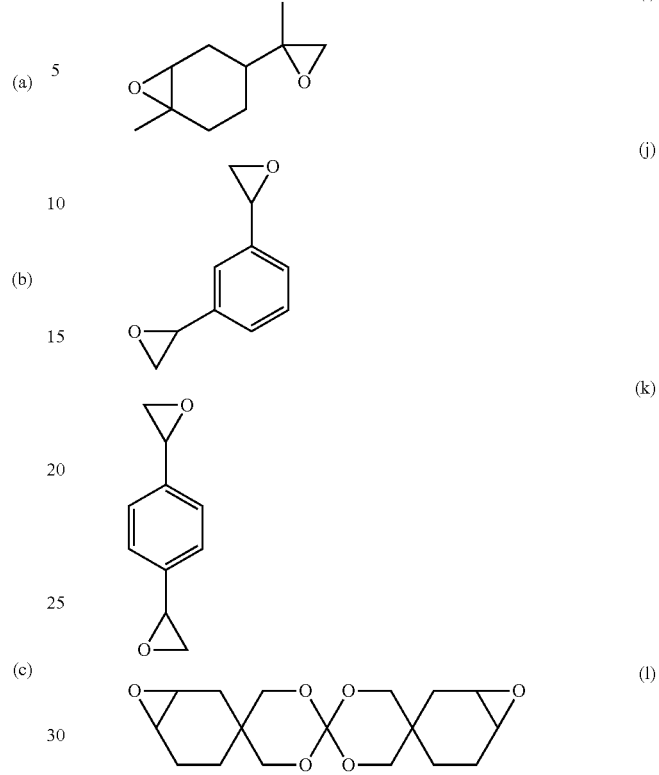

Any suitable curing agent may be used in the present compositions provided that it functions to cure the epoxysiloxane oligomer. Suitable curing agents include, for example, photocuring agents, thermal curing agents, or a combination thereof. Preferably, the present composition comprises a photocuring agent, and more preferably a cationic photoinitiator. Preferably, the present compositions comprise at least 0.5 wt % of a cationic photoinitiator, preferably at least 1 wt %; preferably no more than 5 wt %, and preferably no more than 3 wt %. Preferred initiators include, without limitation, diaryliodonium salts and triarylsulfonium salts. Such curing agents are well-known to those skilled in the art and are generally commercially available from a variety of sources.

Any suitable solvent may be used in the present compositions provided that it provides a transparent composition, that is, a composition that is not turbid. Preferably, the solvent is an aliphatic or aromatic organic solvent. Suitable aliphatic organic solvents are have from 3 to 10 carbon atoms and comprise oxygen, and preferably have one or more functional groups chosen from ketone, ether and ester. Preferably, when the organic solvent is aliphatic, it contains no more than eight carbon atoms, and preferably no more than six. Preferably, the organic solvent molecule contains no atoms other than carbon, hydrogen and oxygen. Preferably, the solvent molecule contains no more than four oxygen atoms, and preferably no more than three. Exemplary organic solvents include, without limitation, cyclohexanone, cyclopentanone, 3-pentanone, 2,6-dimethylcyclohexanone, 2,4-dimethyl-3-pentanone, 2,2,5,5-tetramethyl-3-pentanone, 2,6-dimethyl-4-heptanone, isopropyl acetate, isoamyl acetate, toluene, 1-methoxypropan-2-ol (PGME), 1-ethoxypropan-2-ol (PGEE), methyl 2-hydroxy-2-methylpropanoate (HBM), 1-methoxy-2-methylpropan-2-ol, methyl lactate, ethyl lactate, methyl glycolate, 1-methoxy-propan-2-one, hydroxy acetone, 1,2-dimethoxypropane, 1-methoxy-2-butanol, methyl 2-methoxyacetate, and mixtures thereof. Preferred organic solvents are cyclohexanone, cyclopentanone, 3-pentanone, 2,6-dimethylcyclohexanone, 2,4-dimethyl-3-pentanone, 2,2,5,5-tetramethyl-3-pentanone, 2,6-dimethyl-4-heptanone, isopropyl acetate, isoamyl acetate, toluene, and mixtures thereof. When a mixture of two or more organic solvents is used, such organic solvents may be used in any suitable ratio, such as from 1:99 to 99:1 v/v or w/w.

Optionally, one or more commonly known other additives may be added to the present compositions to further modify properties of the cured coating. Such optional additives include, without limitation, adhesion promoters, leveling agents, defoaming agents, anti-static agents, anti-blocking agents, UV absorbers, optical whitening agents, anti-fingerprint additives, scratch resistance additives, and the like. Mixtures of two or more of such optional additives may be used in the present hard coat compositions. These additives may be in liquid or solid form. Typically, each additive may be used in an amount of 0 to 5 wt %, and preferably from 0.5 to 5 wt %, and more preferably from 1 to 3 wt %, based on the total weight of the composition. Scratch resistance additives may be used in an amount of from ≤5 wt %, preferably ≤3 wt %, and more preferably ≤1.5 wt %, based on the total weight of the composition. A suitable amount of such scratch resistance additives is from 0 to 5 wt %, preferably from 0.1 to 3 wt %, and more preferably from 0.1 to 1.5 wt %, based on the total weight of the composition. Scratch resistance additives may contain small amount of inorganic particles. Other than what may be present in a scratch resistance additive, the present compositions are free of inorganic particles. That is, the present compositions contain ≤5 wt % of inorganic particles, preferably ≤3 wt %, more preferably ≤1.5 wt %, and yet more preferably from 0 to 0.9 wt %.

The present compositions are typically prepared by dispersing the organic particles in the epoxy-siloxane oligomer with the organic solvent. The remaining components may be mixed into the composition either before or after, and preferably after, the organic particles have been disperse in the epoxy-siloxane resin.

The present compositions are particularly useful for forming a hard coat layer on a substrate, particularly a flexible substrate. As used herein, the term "hard coat" refers to a material, coating, or layer on a substrate that forms a film upon curing having a higher pencil hardness than the substrate. As used herein, the term "flexible substrate" refers to a substrate capable of being bent or molded around a radius of 2 mm without breaking, permanent deformation, crease formation, fracture, crack formation, or the like. Exemplary flexible substrates include, but are not limited to, polyimide substrates, polyethylene-terephthalate substrates, polyethylene naphthalate substrates, polycarbonate substrates, poly (methyl methacrylate) substrates, polyethylene substrates, polypropylene substrates, and combinations thereof. Such substrates may have any suitable thickness, depending on the intended use. For example, such substrates may have a thickness ranging from 25 to 250 µm, and preferably from 25 to 150 µm.

In use, the present compositions are disposed on a surface of a flexible substrate by any suitable means known in the art to form a coating composition layer on the flexible substrate. Suitable methods for coating the hard coat composition include, but are not limited to, spin-coating, curtain coating, spray coating, roller coating, doctor blading, bar coating, dip coating, slot die coating, and vapor deposition, among other methods. Next, the coating is baked to remove the organic solvent. The selection of such baking conditions is within the ability of those skilled in the art. Next, the coating is cured, such as by heating or by exposure to actinic radiation (photocuring), and preferably by exposure to UV radiation, to form a hard coat film on the surface of the flexible substrate. Suitable thermal curing conditions include heating the coating at a temperature of 40 to 150° C., preferably 50 to 100° C., for a suitable time, such as from 5 minutes to 6 hours. It is preferred that such thermal curing be performed at a relative humidity of 30 to 95%, and preferably from 40 to 95%.

Typically, the resulting cured coating composition (hard coat) film on the flexible substrate has a thickness in the range of 1 to 50 µm, preferably from 1 to 25 µm, more preferably from 1 to 10 µm. In particular, the cured coating composition film has an elongation-to-break value of >4% at a film thickness of 5 µm, and preferably greater than or equal to 5% at a film thickness of 5 µm. Cured films formed from the present coating compositions typically have a haze value of ≤2%, a yellowness index of >90%, a pencil hardness of ≥4H (measured with a 0.75 kgf vertical load using Mitsubishi UNI pencils on a coating thickness of ca. 50 µm on a 50 µm thick flexible substrate), and an outward bending radius of <5 mm (using a coating thickness of ca. 50 µm on a 50 µm thick flexible substrate).

The cured protective film can optionally be molded thermally to give a permanently curved protective film exhibiting the following properties: a hard coat of 5-10 µm coating thickness with a haze value of ≤2%, yellowness index of >90%, a pencil hardness of ≥3H (at 0.75 kgf), and a desired, permanent curvature radius. Typically, such thermal molding of such protective films is performed by pre-heating the films by a filament placed above the films for short period of time (such as for a few seconds) immediately followed by molding on both sides at high pressure (for example, at a weight of 5000 kg). The mold in contact with the protective films is generally heated, such as at 90° C., while the mold on the opposite side of the film is not heated.

The following general procedures were used in the Examples below.

Pencil Hardness.

Pencil hardness measurements of cured coatings were measured using an automatic pencil hardness tester (PPT-2016, Proyes Testing Equipment). Test was performed based on ASTM standard D3363 at 10 mm/min in speed and at 0.75 kgf vertical load using Mitsubishi UNI pencils. During the tests, the coatings were placed on a flat, clean 0.5 cm thick glass plate.

Indentation Modulus and Hardness.

An iMicro™ nanoindenter (manufactured by Nanomechanics, Inc., Oak Ridge, Tenn.) was used to characterize the indentation modulus and hardness of cured hard coatings. The nanoindenter had load and displacement resolutions of 6 nN and 0.04 nm, respectively. It was operated in continuous stiffness mode in which the indenter tip was continuously oscillated at 2 nm amplitude for better surface detection and extracting mechanical properties as a function of indentation depth from a single measurement. A standard Berkovich tip was used whose projected contact area function was calibrated between 200 and 2000 nm indentation depth by making 20-25 indentations on a fused silica specimen with an indentation modulus of 72 GPa±1 GPa. Samples were mounted on sample holders using a hot melt adhesive with a melting point of approximately 54° C. (Crystal Bond™ 555). Indentations to 2000 nm depth were made on each sample in at least 10 different locations once the test system had reached a thermal drift of <0.1 nm/sec. A Poisson's ratio of 0.3 was assumed. Subsequent to the measurement, 3 to 5 indentations were again made on the fused silica specimen to verify the previous calibration.

Optical Properties.

An HP 8453 UV Vis spectrophotometer system was used to measure the yellowness index of the polyimide substrates and the final coating samples. The values were obtained according to ASTM standard E313. A BYK haze measurement system was used to measure the haze of the coating samples. The haze values were obtained according to ASTM standard D1003.

Elongation-to-Break:

An Instron mechanical tester was used to measure the elongation-to-break of the coatings. Cured coatings on polyethylene terephthalate (PET) substrates were cut to specimens 15 mm wide and ca. 100 mm long. Next, specimens with 60 mm gauge length were gripped by pneumatic grips and then preloaded to 1 MPa in tensile stress. Then, the specimens were loaded in tension at the loading rate of 1 mm/min until a vertical crack was observed. During the tensile test, the specimens were under a white LED light for easier crack detection. Once a crack was found in a specimen, the loading was immediately stopped and corresponding tensile strain was reported as the elongation-to-break value.

Outward Bending Radius:

The outward bending radius of cured coatings was measured using a manual cylindrical bend tester (TQC). The tester was equipped with smooth metal mandrels having different diameters (32, 25, 20, 19, 16, 13, 12, 10, 8, 6, 5, 4, 3, and 2 mm) to apply discrete sets of strain to cured coatings. Cured coatings with a thickness of ca. 50 μm on 50 μm thick PET were used. One side of the cured film was fixed at the bottom of the equipment, and a smooth metal mandrel with a desired diameter was set in the tester. Note that for the initial test, mandrels with sufficiently large diameters were chosen so as not to cause cracking in cured coatings. Then, the cured coating was lightly sandwiched between the mandrel and plastic cylinders such that only tensile bending strain was applied to the top side of the coatings. Subsequently, the cured coating was bent to the radius of the metal mandrel. After the bending, the coating was detached from the tester for visual crack detection. This process was repeated using a smaller sized mandrel until a crack was formed. Once a crack was detected, the smallest mandrel diameter tested that did not show cracking was converted into outward bending radius (division by 2) and reported.

Film Thickness:

Film thickness was measured using a micrometer from Mitsutoyo. The micrometer was re-zeroed before measurements, and subsequently multiple locations on a given film were measured.

Formulation Preparation:

Formulations were prepared by combining the desired amount of resin with the desired amount of solvent and nanoparticle suspension in a 20 mL scintillation vial, followed by sonication (Fisher Scientific bath sonicator) and vortex mixing at room temperature until a homogenous mixture was obtained. Lastly, the desired amount of photoacid generator (PAG) was added into the solution. The final formulation was left on a rotary mixer for at least one hours at room temperature to ensure homogenous mixing before film casting.

Film Casting:

PET substrates were cleaned by filtered laboratory air. An automatic Elcometer draw-down coater was used to cast films of the formulations on PET substrates at room temperature. Draw-down bars with different gaps were used to obtain the desired coating thickness of ca. 40 μm. The films were then UV-cured using a Fusion 300 conveyor system (irradiance ca. 3000 mW/cm$^2$). Each film passed the lamp four times at 47 feet per minute, respectively. The average values for energy density at 47 fpm are around 480, 120, 35, and 570 mJ/cm$^2$ in the UVA, UVB, UVC, and UVV regimes, respectively.

Comparative Polymer 1.

2-(3,4-Epoxycyclohexyl)ethylmethyldiethoxysilane (10.000 g, 38.7 mmol) was mixed with water (0.699 g, 38.8 mmol) at ambient temperature in a 50 mL 1-neck round-bottom heavy wall flask containing a cylindrical Teflon™ stir bar, followed by addition of Amberlyst™ A-26 (OH form, 0.809 g). A reflux condenser was attached to the flask, the flask was placed in a heating block preheated to 70° C. (monitored by an external thermocouple), and the reaction mixture was stirred at 400 rpm. After 23.5 hours, the reaction mixture was cooled to ambient temperature, filtered (polytetrafluoroethylene (PTFE) syringe filter with pore size 1.0 μm) and concentrated in vacuuo (0.5 mtorr) with stirring at ambient temperature for at least three hours to give ca. 4.8 g of a clear epoxy-siloxane resin (Comparative Polymer 1), having a D:T ratio of 1:0. Analysis by GPC, IR, and NMR confirmed the polymer. The remaining resin was stored at 4° C.

Comparative Polymer 2.

2-(3,4-Epoxycyclohexyl)ethylmethyldiethoxysilane (5.166 g, 20.0 mmol) and 2-(3,4-epoxycyclohexyl)ethyltriethoxysilane (23.108 g, 80.1 mmol) were mixed with water (2.703 g, 150 mmol) at ambient temperature in a 100 mL 1-neck round-bottom heavy wall flask containing a cylindrical Teflon™ stir bar, followed by addition of Amberlyst™ A-26 (OH form, 1.700 g). A reflux condenser was attached to the flask, the flask was placed in a heating block preheated to 90° C. (monitored by an external thermocouple), and the reaction mixture was stirred at 500 rpm. After 19 hours, the reaction mixture was cooled to ambient temperature, filtered (PTFE syringe filter with pore size 1.0 μm) and concentrated in vacuuo (0.5 mtorr) with stirring at ambient temperature for at least three hours to give ca. 12 g of a clear epoxy-siloxane resin (Comparative Polymer 2), having a D:T ratio of 1:4. Analysis by GPC, IR, and NMR confirmed the polymer. The remaining resin was stored at 4° C.

Comparative Polymer 3.

2-(3,4-Epoxycyclohexyl)ethylmethyldiethoxysilane (2.582 g, 10.0 mmol) and 2-(3,4-epoxycyclohexyl)ethyltriethoxysilane (25.950 g, 90.0 mmol) were mixed with water (2.7060 g, 150 mmol) at ambient temperature in a 100 mL 1-neck round-bottom heavy wall flask containing a cylindrical Teflon™ stir bar, followed by addition of Amberlyst™ A-26 (OH form, 1.700 g). A reflux condenser was attached to the flask, the flask was placed in a heating block preheated to 90° C. (monitored by an external thermocouple), and the reaction mixture was stirred at 500 rpm. After 19 hours, the reaction mixture was cooled to ambient temperature, filtered (PTFE syringe filter with pore size 1.0 μm) and concentrated in vacuuo (0.5 mtorr) with stirring at ambient temperature for at least three hours to give ca. 12 g of a clear epoxy-siloxane resin (Comparative Polymer 3), having a D:T ratio of 1:9. Analysis by GPC, IR, and NMR confirmed the polymer. The remaining resin was stored at 4° C.

Polymer 1.

2-(3,4-Epoxycyclohexyl)ethylmethyldiethoxysilane (9.684 g, 37.4 mmol) and 2-(3,4-epoxycyclohexyl)ethyltriethoxysilane (3.618 g, 12.5 mmol) were mixed at ambient temperature in a 50 mL 1-neck round-bottom heavy wall flask containing a cylindrical Teflon™ stir bar, then water (1.087 g, 60.3 mmol) was added, followed by Amberlyst™ A-26 (OH form, 1.067 g). A reflux condenser was attached to the flask, the flask was placed in a heating block preheated to 90° C. (monitored by an external thermocouple), and the reaction mixture was stirred at 400 rpm. After 23 hours, the reaction mixture was cooled to ambient temperature, filtered (PTFE syringe filter with pore size 1.0 µm) and concentrated in vacuuo (0.5 mtorr) with stirring at ambient temperature for at least three hours to give ca. 5.5 g of a clear epoxy-siloxane resin (Polymer 1), having a D:T ratio of 3:1. Analysis by GPC, IR, and NMR confirmed the polymer. The remaining resin was stored at 4° C.

Polymer 2.

2-(3,4-Epoxycyclohexyl)ethylmethyldiethoxysilane (6.476 g, 25.1 mmol) and 2-(3,4-epoxycyclohexyl)ethyltriethoxysilane (7.220 g, 25.0 mmol) were mixed at ambient temperature in a 50 mL 1-neck round-bottom heavy wall flask containing a cylindrical Teflon™ stir bar, then water (1.220 g, 67.7 mmol) was added, followed by addition of Amberlyst™ A-26 (OH form, 1.090 g). A reflux condenser was attached to the flask, the flask was placed in a heating block preheated to 90° C. (monitored by an external thermocouple), and the reaction mixture was stirred at 400 rpm. After 24 hours, the reaction mixture was cooled to ambient temperature, filtered (PTFE syringe filter with pore size 1.0 µm) and concentrated in vacuum (0.5 mtorr) under stirring at ambient temperature for at least three hours to give ca. 6.0 g of a clear epoxy-siloxane resin (Polymer 2), having a D:T ratio of 1:1. Analysis by GPC, IR, and NMR confirmed the polymer. The remaining resin was stored at 4° C.

Polymer 3.

2-(3,4)-Epoxycyclohexyl)ethylmethyldiethoxysilane (7.770 g, 30.1 mmol) and 2-(3,4-epoxycyclo-hexyl)ethyltriethoxysilane (5.771 g, 20.0 mmol) were mixed at ambient temperature in a 50 mL 1-neck round-bottom heavy wall flask containing a cylindrical Teflon™ stir bar, then water (1.150 g, 64.2 mmol) was added, followed by addition of Amberlyst A-26 (OH form, 1.080 g). A reflux condenser was attached to the flask, the flask was placed in a heating block preheated to 90° C. (monitored by an external thermocouple), and the reaction mixture was stirred at 400 rpm. After 24 hours, the reaction mixture was cooled to ambient temperature, filtered (PTFE syringe filter with pore size 1.0 µm) and concentrated in vacuo (0.5 mtorr) with stirring at ambient temperature for at least three hours to give ca. 5.7 g of a clear epoxy-siloxane resin (Polymer 3), having a D:T ratio of 1:1.5. Analysis by GPC, IR, and NMR confirmed the polymer. The remaining resin was stored at 4° C.

Inventive Formulations.

Formulations of the invention were prepared by combining Polymer 1 (100 parts by weight) with the components in the amounts indicated in Table 1 according to the general procedure described above. In each formulation, the reactive modifier was (7-oxabicyclo-[4.1.0]heptan-3-yl)methyl 7-oxabicyclo[4.1.0]heptane-3-carboxylate. The organic particles were CSR particles (Kaneka Kane ACE MX-551) having an average particle diameter of 100 nm. The curing agent used was a mixture of (thiobis(4,1-phenylene))bis(diphenylsulfonium) hexafluoro-antimonate and diphenyl(4-(phenylthio)phenyl)sulfonium hexafluoroantimate. All amounts are reported in parts by weight. The solvent used for each of Formulations 1-5 was cyclohexanone. The solvent used for Formula 6 was 3-pentanone. The amount of solvent was adjusted from 20-50 wt % to control film thickness. Films of each formulation were prepared and analyzed according to the general procedures described above yielding the results reported in Table 1.

TABLE 1

| | Formulation: | | | | | |
|---|---|---|---|---|---|---|
| | 1 | 2 | 3 | 4 | 5 | 6 |
| Reactive modifier | 10.3 | 10.3 | 10.3 | 3.2 | 18.8 | 10.3 |
| Organic Particles | 3.5 | 3.5 | 3.5 | 1.1 | 6.3 | 3.5 |
| Curing agent | 1.2 | 1.2 | 1.2 | 1.1 | 1.3 | 1.2 |
| Solvent | 1.2 | 1.2 | 1.2 | 1.1 | 1.2 | 1.2 |
| Pencil hardness | — | — | 4 H | — | — | — |
| Outward radius (mm) | 4 | — | 2.5 | — | — | 4 |
| Elongation-to-break (%), | 6.8, | 12.6, | 7.6, | 3.8, | 5.7, | 6.5, |
| Film thickness (µm) | 5-7 | 2-3 | 2-3 | 8-10 | 8-10 | 6-8 |

Comparative Formulations.

Comparative Formulations were prepared by combining the comparative polymer indicated (100 parts by weight) with the components in the amounts indicated in Table 2 according to the general procedure described above. In each formulation, the reactive modifier was (7-oxabicyclo-[4.1.0]heptan-3-yl)methyl 7-oxabicyclo[4.1.0]heptane-3-carboxylate. The organic particles were CSR particles (Kaneka Kane ACE MX-551) having an average particle diameter of 100 nm. All amounts are reported in parts by weight. Comparative Polymer 4 was an epoxy-siloxane resin (PC 2000HV, having the structure identified in U.S. Pat. No. 7,285,842, which has a D:T ratio of 0:1, purchased from Polyset Company, Inc. (Mechanicville, N.Y.). The alumina and silica nanoparticle products, BYK3601 and BYK 3605, respectively, were purchased from BYK-Chemie GmbH (Wesel, Germany). The curing agent used was a mixture of (thiobis(4,1-phenylene))bis(diphenylsulfonium) hexafluoro-antimonate and diphenyl(4-(phenylthio)phenyl)-sulfonium hexafluoroantimate. The solvent used for each comparative formulation, except for Comparative Formulations C7 and C8, was a 1:1 w/w mixture of 2,4-dimethyl-3-pentanone and toluene. In Comparative Formulations C7 and C8, the solvent used was cyclohexanone. The amount of solvent in each formulation was adjusted from 20-50 wt % to control film thickness. Films of each formulation were prepared and analyzed according to the general procedures described above yielding the results reported in Table 2.

TABLE 2

| | Comparative Formulation: | | | | | | | |
|---|---|---|---|---|---|---|---|---|
| | C1 | C2 | C3 | C4 | C5 | C6 | C7 | C8 |
| Comparative Polymer: | 2 | — | — | 1 | 4 | 4 | — | — |
| Inventive Polymer: | — | 2 | 1 | — | — | — | 1 | 1 |
| Reactive modifier | — | — | — | — | 10.3 | 10.3 | 2.2 | 1.6 |
| Organic particles | — | — | — | — | 3.5 | 3.5 | — | — |
| Alumina particles (40 mn) | — | — | — | — | — | — | 0.9 | — |
| Silica particles (20 nm) | — | — | — | — | — | — | — | 1.6 |
| Curing agent | 1 | 1 | 1 | 1 | 1.2 | 1.2 | 1 | 1 |
| Solvent | 1 | 1 | 1 | 1 | 1.2 | 1.2 | 1 | 1 |

TABLE 2-continued

| | Comparative Formulation: | | | | | | | |
|---|---|---|---|---|---|---|---|---|
| | C1 | C2 | C3 | C4 | C5 | C6 | C7 | C8 |
| Pencil hardness | 5 H | 6 H | 4 H | 3 H | 4 H | 4 H | — | — |
| Outward radius (mm) | 6.5 | 5 | 5 | 4 | 2.5 | 2.5 | — | — |
| Elongation-to-break (%), | 3.2, | 2.9, | 3.2, | 8.5, | 4.4, | 2.8, | 3.4, | 3.1, |
| Film thickness (μm) | 4-6 | 7-12 | 9-10 | 2-5 | 2-3 | 7-10 | 5-6 | 7-8 |

What is claimed is:

1. A composition comprising: (a) 5 to 85 wt % of an epoxy-siloxane oligomer comprising as polymerized units one or more difunctional silane monomers of formula (1) and one or more trifunctional silane monomers of formula (2) in a mole ratio of 95:5 to 10:30

$$Si(R^1)(R^2)(Y^1)_2 \quad (1)$$

$$SiR^3(Y^2)_3 \quad (2)$$

wherein $R^1$, $R^2$, and $R^3$ are independently chosen from a $C_{5-20}$-aliphatic group comprising an oxirane ring fused to an alicyclic ring, $C_{1-20}$-alkyl, $C_{6-30}$-aryl group, and a $C_{5-20}$-aliphatic group having one or more heteroatoms; each $Y^1$ and $Y^2$ is independently chosen from halogen, $C_{1-4}$-alkoxy, and —O—$C_{1-4}$-acyl group; wherein at least one of $R^1$, $R^2$, and $R^3$ is a $C_{5-20}$-aliphatic group comprising an oxirane ring fused to an alicyclic ring; (b) 1 to 20 wt % of organic particles having an average diameter of 50 to 250 nm; (c) 3 to 50 wt % of a reactive carrier having one or more epoxy moieties or oxetane moieties; (d) 0.5 to 8 wt % of a curing agent; and (e) 1 to 60 wt % of one or more organic solvents.

2. The composition of claim 1 wherein the organic particles are core-shell rubber nanoparticles.

3. The composition of claim 1 wherein the reactive carrier comprises at least two epoxycyclohexane groups or at least two oxetane rings.

4. The composition of claim 1 wherein at least one of $R^1$, $R^2$, and $R^3$ is a $C_{5-20}$-aliphatic group comprising an oxirane ring fused to an alicyclic ring having 5 or 6 carbon atoms.

5. The composition of claim 1 wherein the curing agent is a cationic photoinitiator.

6. The composition of claim 1 wherein the composition further comprises one or more additives selected from the group consisting of adhesion promoters, leveling agents, defoaming agents, anti-static agents, anti-blocking agents, UV absorbers, optical whitening agents, anti-fingerprint additives, and scratch resistance additives.

7. A method comprising: (a) providing a flexible substrate; and (b) disposing a layer of a coating composition of claim 1 on the flexible substrate; and (c) curing the layer of the coating composition.

8. The method of claim 7 wherein the flexible substrate is selected from the group consisting of polyimide substrates, polyethylene-terephthalate substrates, polyethylene naphthalate substrates, polycarbonate substrates, poly(methyl methacrylate) substrates, polyethylene substrates, polypropylene substrates, and combinations thereof.

9. The method of claim 7 wherein the curing step comprises thermal curing, photocuring, or a combination thereof.

10. The method of claim 7 wherein the cured coating composition has an elongation to break of >4% at a film thickness of 5 μm.

* * * * *